US007917382B2

(12) United States Patent
Cereghini et al.

(10) Patent No.: US 7,917,382 B2
(45) Date of Patent: Mar. 29, 2011

(54) INTEGRATION OF VISUALIZATIONS, REPORTS, AND DATA

(75) Inventors: Paul Cereghini, Escondido, CA (US); Kavitha Devarakonda, Edison, NJ (US); Giai Do, San Diego, CA (US); Eric Dunsker, Atlanta, GA (US); Ahsan U. Haque, Piscataway, NJ (US); Karen Papierniak, Fenton, MI (US); Sreedhar Srikant, Marietta, GA (US); Ellen Boerger, Gainesville, GA (US)

(73) Assignee: Teradata US, Inc., Dayton, OH (US)

( * ) Notice: Subject to any disclaimer, the term of this patent is extended or adjusted under 35 U.S.C. 154(b) by 2968 days.

(21) Appl. No.: 10/378,682

(22) Filed: Mar. 5, 2003

(65) Prior Publication Data

US 2004/0174397 A1  Sep. 9, 2004

(51) Int. Cl.
*G06F 17/30* (2006.01)
(52) U.S. Cl. .............................................. 705/10; 705/7
(58) Field of Classification Search .................. 705/7, 10
See application file for complete search history.

(56) References Cited

U.S. PATENT DOCUMENTS

| | | | | |
|---|---|---|---|---|
| 6,304,904 B1 * | 10/2001 | Sathyanarayan et al. | ..... | 709/224 |
| 6,341,310 B1 * | 1/2002 | Leshem et al. | ................ | 709/223 |
| 6,393,479 B1 * | 5/2002 | Glommen et al. | ............ | 709/224 |
| 6,963,874 B2 * | 11/2005 | Kasriel et al. | .................... | 707/10 |
| 7,043,702 B2 * | 5/2006 | Chi et al. | ........................ | 715/853 |
| 2002/0087679 A1 * | 7/2002 | Pulley et al. | .................. | 709/224 |
| 2003/0131097 A1 * | 7/2003 | Kasriel et al. | ................. | 709/224 |
| 2004/0059746 A1 * | 3/2004 | Error et al. | ..................... | 707/102 |

* cited by examiner

*Primary Examiner* — Lynda C Jasmin
*Assistant Examiner* — Thomas Mansfield
(74) *Attorney, Agent, or Firm* — Lowe, Hauptman, Ham & Berner, LLP

(57) ABSTRACT

A method of graphically displaying the path of a customer traversing a web site and related business data is described. The method includes receiving a user request for a visualization. The user request may include data filters and exclusions. Responsive to the user request, traffic data is selected for analysis. The selected traffic data is analyzed and displayed to the user. The display may be in the form of a visualization including a graph and related business data. The graph may be of an overview, referral, path, page-to-page path, and animation type. A system for visualizing traffic patterns and the path of a customer at a site is described in conjunction with the above method. The system includes a logical data model, a dimensional data model, a report specification, a graphical interface, metadata database and an analysis report. The graphical interface is used for viewing visualization information.

18 Claims, 14 Drawing Sheets

Vertices = {A,B,C,D,E,F,G}

Edges = {AB,BC,CD,BD,CE,EG,FG,AG}

INTEGRATION OF VISUALIZATIONS, REPORTS, AND DATA

FIELD OF THE INVENTION

The present invention relates generally to web site visualization tools, and more particularly, to a web site visualization tool including integrated visualization and on-line analytical processing (OLAP) reporting functionality.

BACKGROUND ART

Market Trends

E-store Merchandising—The layout and merchandising of the electronic or online store or website, i.e., e-store, is becoming critically important to online retailers, i.e., e-tailers. The e-tailers need to know how customers are shopping their sites so e-tailers can understand how products and promotions are viewed by customers and where to place internal site promotions. Awareness of customer or shopper traffic patterns also helps e-tailers maximize the value of advertising space sold to vendors.

E-store Marketing—Revenues from the e-store site come from direct product revenue as well as display and vendor ads. It is important to understand the traffic patterns and the types of customers on each area of the site to optimize funds for marketing promotions on the site.

Visualization and OLAP reporting functionality currently exist in separate products, e.g., Visual Insights' Advizor and eBiz, Tom Sawyer, Cognos, and MicroStrategy, but the individual products are not integrated. A user is forced to select reports or visualizations, metrics, and filters in each individual tool and then align and compare the results for each set of data to be analyzed. The selection, alignment and comparison process is time consuming and user intensive requiring a substantial investment of time for a user to be able to analyze data. Further complicating matters, the user is required to use multiple, different, individual tools. Thus, there is a need in the art for a web site visualization tool integrating visualization and OLAP reporting functionality.

DISCLOSURE/SUMMARY OF THE INVENTION

It is therefore an object of the present invention to provide a web site visualization tool integrating visualization and OLAP reporting functionality.

Another object of the present invention is to reduce the amount of time for a user to obtain visualization analysis data.

The above described objects are fulfilled by a method of graphically displaying the path of a customer traversing a web site and related business data is described. The method includes receiving a user request for a visualization. The user request may include data filters and exclusions. Responsive to the user request, traffic data is selected for analysis. The selected traffic data is analyzed and displayed to the user. The display may be in the form of a visualization including a graph and related business data. The graph may be of an overview, referral, path, page-to-page path, and animation type.

In a system aspect, a system for visualizing traffic patterns and the path of a customer at a site is described. The system includes a logical data model, a dimensional data model, a report specification, a graphical interface, and an analysis report. The graphical interface is used for viewing visualization information.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

Figure 11:
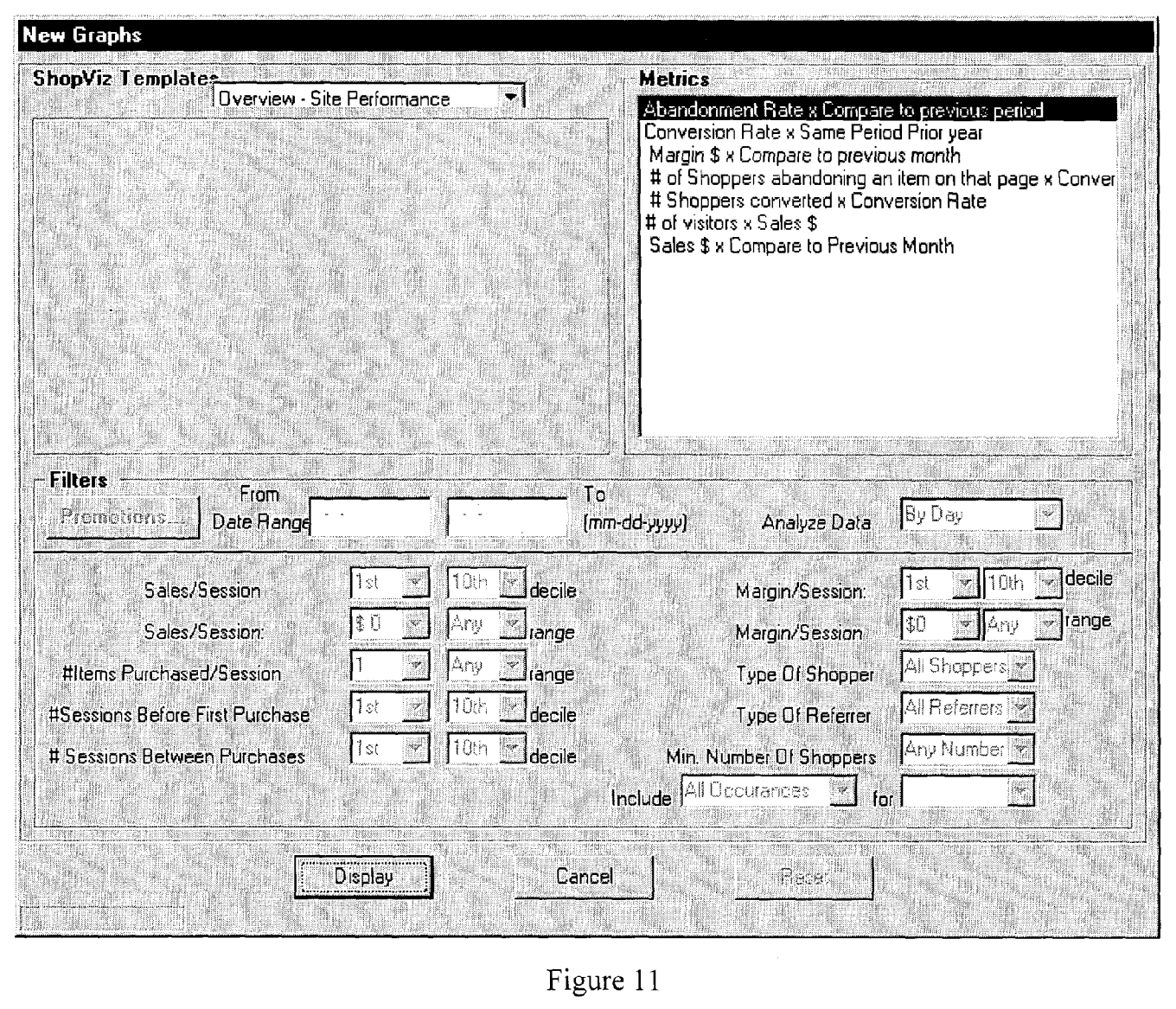

FIG. 11 is an example screenshot of a new graph window resulting from a user selecting the corresponding Graph New menu in the screenshot of FIG. 10.

MODE FOR CARRYING OUT THE INVENTION

A method and apparatus for a web site visualization tool integrating visualization and OLAP reporting functionality are described. In the following description, for purposes of explanation, numerous specific details are set forth in order to provide a thorough understanding of the present invention. It will be apparent; however, that the present invention may be practiced without these specific details. In other instances, well-known structures and devices are shown in block diagram form in order to avoid unnecessarily obscuring the present invention.

Hardware Overview

Figure 1:
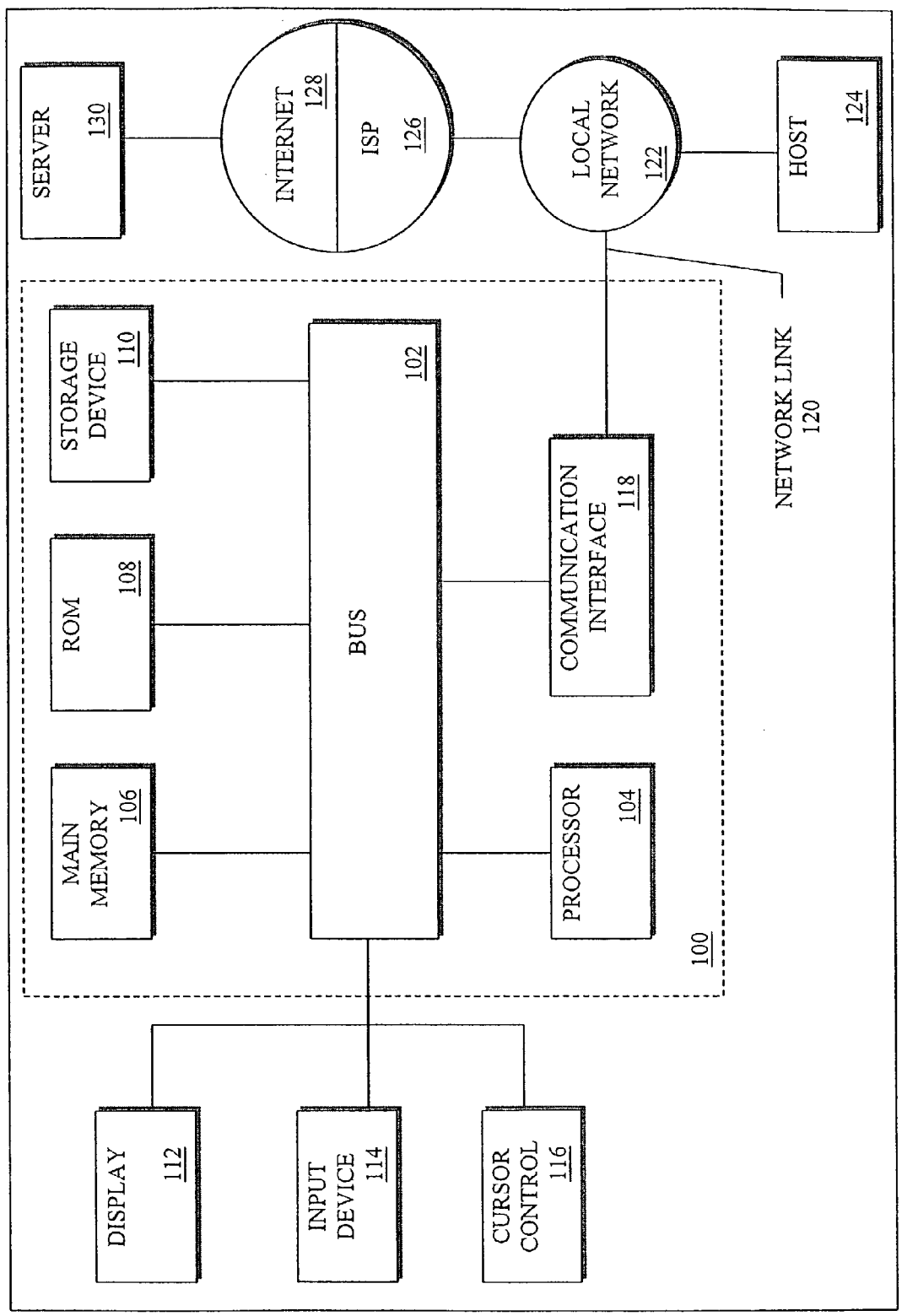
FIG. 1 is a block diagram of an example computer system upon which an embodiment of the present invention may be implemented.

FIG. 1 is a block diagram illustrating an exemplary computer system 100 upon which an embodiment of the invention may be implemented. The present invention is usable with personal computers, mini-mainframes and the like.

Computer system 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing information and instructions to be executed by processor 104. Main memory 106 also may be used for storing rules, graphs, thresholds, triggers, and databases (described in detail below), and temporary variables or other intermediate information during execution of instructions to be executed by processor 104. Computer system 100 further includes a read only memory (ROM) 108 or other static storage device coupled to the bus 102 for storing static information and instructions for the processor 104, including the rules, graphs, thresholds, triggers, and databases described below. A storage device 110, such as a magnetic disk or optical disk, is provided and coupled to the bus 102 for storing information and instructions.

Computer system 100 may be coupled via the bus 102 to a display 112, such as a cathode ray tube (CRT) or a flat panel display, for displaying information to a computer user. An input device 114, including alphanumeric and other keys, is coupled to the bus 102 for communicating information and command selections to the processor 104. Another type of user input device is cursor control 116, such as a mouse, a trackball, or cursor direction keys for communicating direction information and command selections to processor 104 and for controlling cursor movement on the display 112. This input device typically has two degrees of freedom in two axes, a first axis (e.g., x) and a second axis (e.g., y) allowing the device to specify positions in a plane.

The invention is related to the use of a computer system 100, such as the illustrated system, to provide a web site and web page visualization tool. According to one embodiment of the invention, a web site and web pages visualization tool is provided by computer system 100 in response to processor 104 executing sequences of instructions contained in main memory 106 to display integrated visualization and OLAP reporting functionality. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 106 causes the processor 104 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 100 also includes a communication interface 118 coupled to the bus 102. Communication interface 108 provides a two-way data communication as is known. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals which carry digital data streams representing various types of information. Although not required for operation of the present invention, the communications through interface 118 may permit transmission or receipt of the web site visualization tool or access to the data needed by the web site visualization tool. For example, two or more computer systems 100 may be networked together in a conventional manner with each using the communication interface 118.

Network link 110 typically provides data communication through one or more networks to other data devices. For example, network link 110 may provide a connection through local network 122 to a host computer 124 or to data equipment operated by an Internet Service Provider (ISP) 126. ISP 126 in turn provides data communication services through the world wide packet data communication services through the world wide packet data communication network now commonly referred to as the "Internet" 128. Local network 122 and Internet 128 both use electrical, electromagnetic or optical signals which carry digital data streams. The signals through the various networks and the signals on network link 110 and through communication interface 118, which carry the digital data to and from computer system 100, are exemplary forms of carrier waves transporting the information.

Computer system 100 can send messages and receive data, including program code, through the network(s), network link 110 and communication interface 118. In the Internet example, a server 130 might transmit a requested code for an application program through Internet 128, ISP 126, local network 122 and communication interface 118. In accordance with the invention, one such downloaded application provides for a web site visualization tool, as described herein.

The received code may be executed by processor 104 as it is received, and/or stored in storage device 110, or other non-volatile storage for later execution. In this manner, computer system 100 may obtain application code in the form of a carrier wave.

Top Level Description

An embodiment of the present invention is known as ShopViz. ShopViz graphically displays user paths taken through a web site and allows easy access to additional data representations. Reports and visualization objects are integrated to help the ShopViz user, or e-tailer, quickly focus on a data set and allow for more analysis time.

DETAILED DESCRIPTION

The ShopViz software program graphically displays the traffic patterns and paths of individual customers on an e-store, i.e., an online or web-based store. ShopViz integrates graphical visualizations, reports, and web pages allowing the user to understand the high level picture and drill down, as needed, into the details. The user can select a specific report from a list of reports related to the visualization for further data analysis. The user can also display an individual web page to verify what a customer of the e-store sees when visiting the e-store.

The Shop Viz system includes the following components:
  a Decisions Logical Data Model;
  a Dimensional data model;
  a Report Specification;
  Graphical Interface for viewing path information; and
  OLAP Analysis Reports using Microstrategy product suite for development of the reports.

Functionality and Features

ShopViz presents shopper or customer activity in a graphical form to enhance the user ability to analyze and manage retail web sites. Shop Viz presents web site business performance and shopper navigation data in visual formats that enable users to analyze data and make informed decisions. Users can hone the data examined using numerous date-, customer- and shopping-related filters.

ShopViz also enables users to directly access reports related to the web pages being presented.

Figure 2:
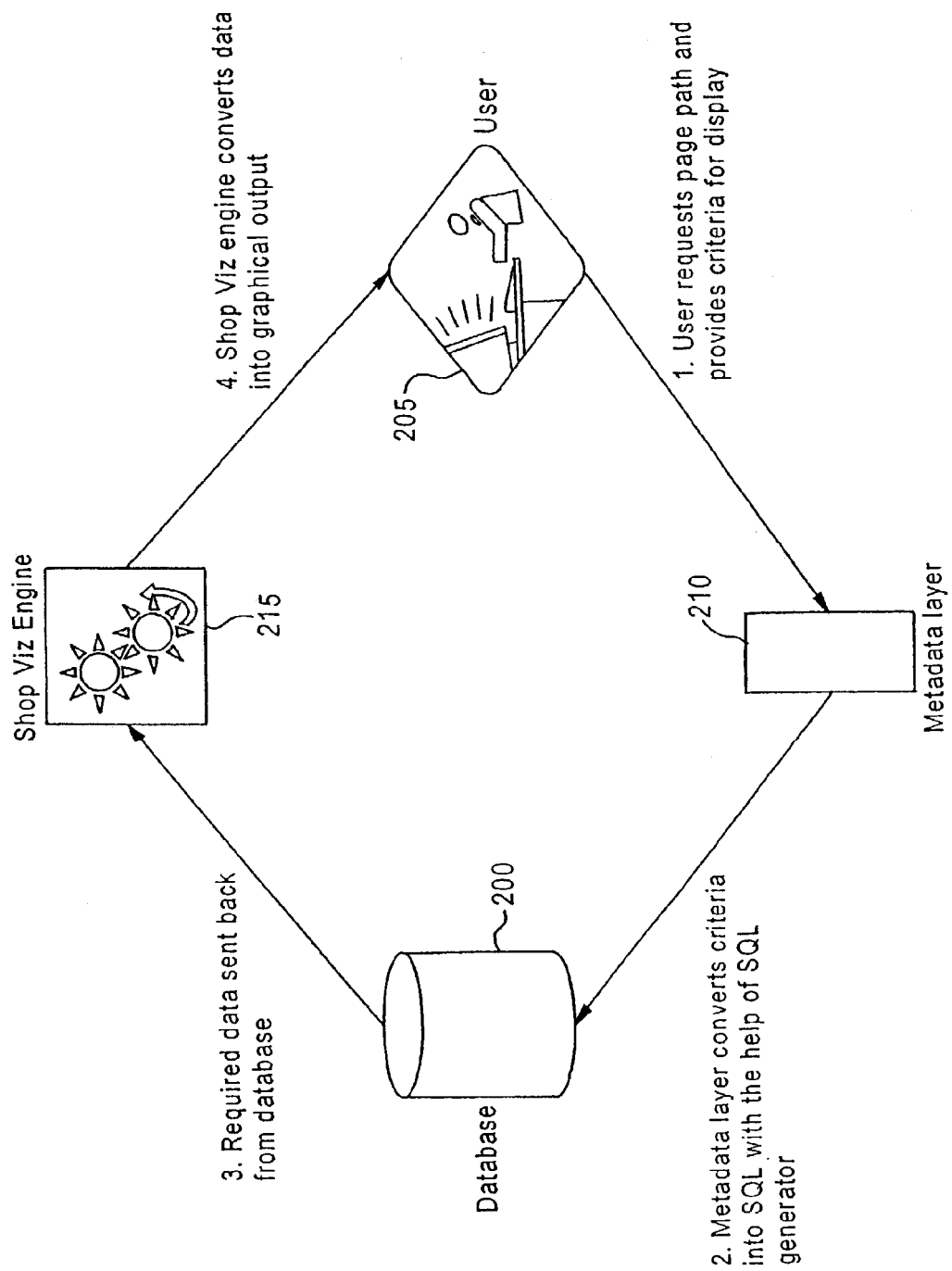
FIG. 2 is a high level flow diagram of an embodiment of the present invention.

Reference is now made to FIG. 2 wherein a high level flow diagram of an embodiment of the present invention is shown. A user 205 desiring to perform a visualization analysis of a particular web page of an e-store interacts with an interface of the present invention, more fully described below.

Figure 4:
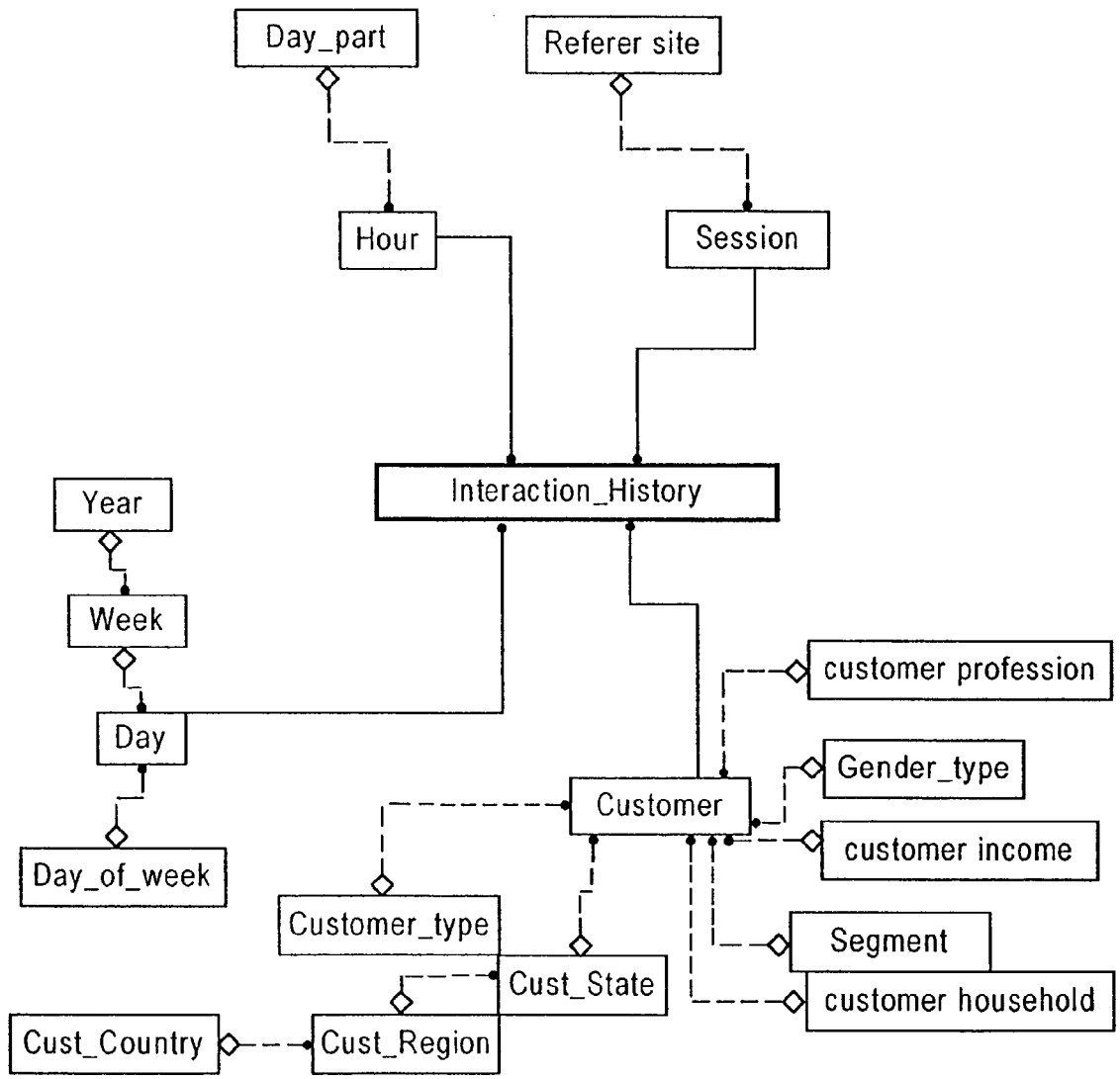
FIG. 4 is an example dimensional model of a customer interaction data model useable in conjunction with an embodiment of the present invention.

Web traffic generated by a customer visit to an e-store is captured and stored in a database 200 using a Customer Interaction Data Model (CIDM) such as the one described in co-pending patent application Ser. No. 09/658,455 entitled "Cross Session Relationship Management" and commonly assigned to the present assignees, which is hereby incorporated by reference in its entirety. A sample dimensional model of the CIDM useable with the present invention is shown in FIG. 4. A Metadata layer 210 is used to pre-select web traffic data from database 200 based on the user-specified requirements. The user interface provides the user with the option of connecting to the database 200. The Metadata layer 210 converts the user's English-like pre-selection statements into Structured Query Language (SQL) and sends the query to the database. In response, the selected web traffic data is sent to a ShopViz engine 215, i.e., software program or process. The ShopViz engine 215 transforms the data from the database and stores it in a graph data structure. After analysis, the ShopViz engine 215 graphically lays out the acquired web traffic information for viewing by the user 205.

The ShopViz engine 215 includes the following components:
1. Relational-to-Graph converter: Conversion component that reads data in the relational format and stores data in a graph data structure; and
2. Graph layout converter: Display component that converts the data in graph structures into a visual display that is comprehensive, concise and easy for interpretation.

The components of the ShopViz engine 215 are explained in greater detail below.

Relational to Graph Converter

The relational to graph converter generates a graph data structure and performs other operations, such as deriving number of entry and exit paths out of a node, e.g., a web page at the e-store, or the frequency of visits on a given edge, e.g., a hyper link to an e-store or a web page at the e-store.

The converter includes a conversion algorithm including the following steps:
1. Choose a graph data structure, e.g., based on an edge list structure or an adjacency list structure. These structures are known to persons of ordinary skill in the art and will not be further described in detail. The data structure is used to store both edge and node information. Assume an object oriented implementation of the data structure for the following description.
2. Read the relational table containing the web path information. Table 1.0 is a portion of a sample relational table. For every new entry in the From/To columns, the relational-to-graph converter inserts a node with that name in the data structure. The edge information e.g., from a and to b, (a, b), captures the path information between nodes using a graph data structure. Additional methods can be used to capture information about the number of entry/exit paths of a node, frequency of visits on a given edge. Table 2 is a portion of a corresponding graph structure.

TABLE 1

| Attribute a (primary key) | Attribute b | ... | From | To |
|---|---|---|---|---|
| 100200 | External | | a | b |
| 200300 | Internal | | b | c |
| 100400 | External | | a | d |
| 400500 | External | | d | e |
| 400600 | Internal | | d | f |
| 300600 | Internal | | c | f |

TABLE 2

| Node | Edge |
|---|---|
| a, b | (a, b) |
| C | (b, c) |
| D | (a, d) |
| E | (d, e) |
| F | (d, f) |
| — | (c, f) |

Graph Layout Converter

Directed graphs can be laid out using various available algorithms known to persons of ordinary skill in the art. Refer for instance to "*Computational Geometry: Theory and Applications*" by Giuseppe Di Battista, Peter Eades, Roberto Tamassia, and Ioannis Tollis. ShopViz incorporates several algorithms and provides the user a choice of laying out the graph based on user selection. Some of the standard algorithms include:

Planar layout: A graph format in which no two edges cross each other;

Grid layout: Graph vertices, crossings and edge bends have integer coordinates;

Hierarchical layout: Graph vertices are depicted in the order of occurrence;

Circular layout: Each block in a graph is represented as a circle around its cut vertex; and Fisheye layout: A wide angle or fisheye layout integrates local detail and global context, thus providing a balanced depiction of the graph to the user.

Various additional known methods are used to manipulate the color and thickness of nodes and edges.

Graph Manipulating Architecture

An object oriented approach is used for graph layout and a sample list of classes and methods with their functions is presented in Table 3 below. Using these classes and methods, various tasks are performed providing useful information about the graphs. Note that this is a sample list and does not represent all the classes and methods available to the application.

TABLE 3

| Class | Method | Description |
|---|---|---|
| Nodes ( ) | | Node class |
| | CountNodes( ) | Count number of nodes in a graph |
| | Indegree( ) | Number of directed edges leading to a node |
| | Outdegree( ) | Number of directed edges leading away from a node |

TABLE 3-continued

| Class | Method | Description |
|---|---|---|
| | TimeAtNode( ) | Time spent at a node |
| | NodeColor( ) | Color of node: to signify a criterion (example: the color could be related to the node frequency) |
| | NodeFrequency( ) | The count of a metric associated with a node (example: total page visits, total product sales, etc). |
| Edges( ) | CountEdges( ) | Count of the number of edges in a graph |
| | EdgeColor( ) | Color of edge to signify a criterion (example: the color could be related to the edge frequency) |
| | EdgeFrequency( ) | The count of a metric associated with an edge (example: total paths between two nodes) |
| | EdgeThickness( ) | The thickness of the edge used to signify a criterion (example: paths that represent traffic of frequent shoppers can have thicker edges) |

Figure 3:
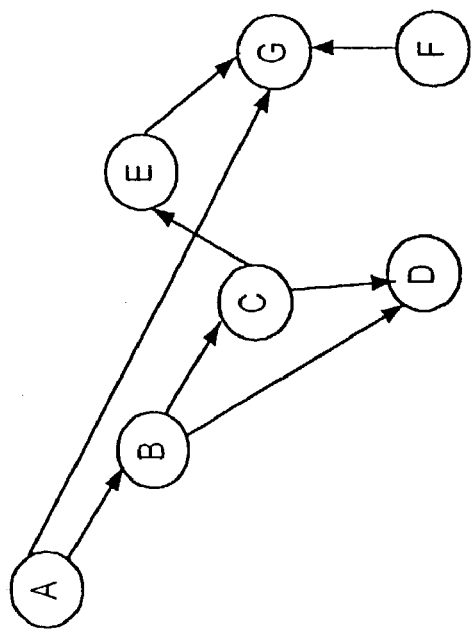
FIG. 3 is two example graph outputs of the graph layout converter of the present invention.
Figure 3:
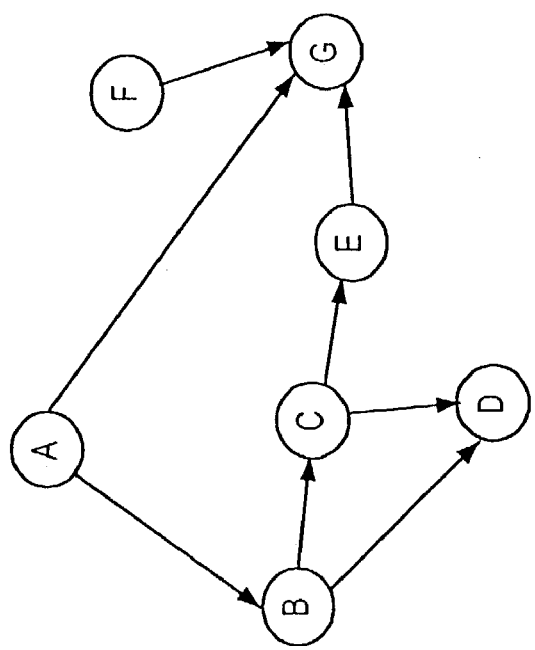

Sample graph outputs depicting visual example output of the tool are shown in FIG. 3.

Metadata Layer

The metadata layer 210 includes a set of data structures representing information about various tables and views available in the database for obtaining data for visualization. The metadata layer 210 isolates any changes at the database level from the user 205. A SQL generator in metadata layer 210 converts the user query into SQL and sends the query to database 200. Visualization specific data, for example, criteria for display is also stored in metadata database.

Figure 5:
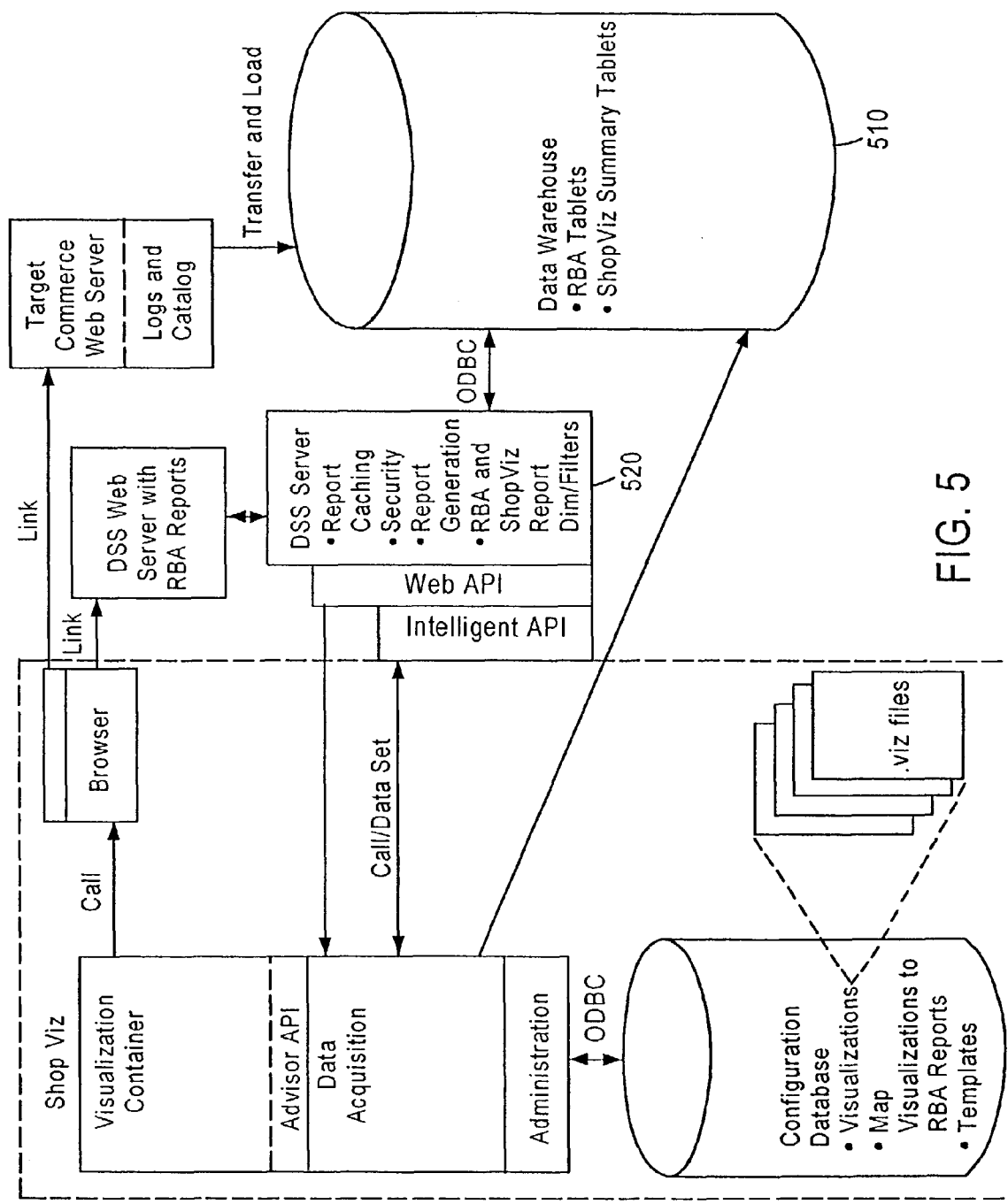
FIG. 5 is a high level block diagram of an embodiment of the present invention in use in conjunction with a data warehouse and decision support server.

The ShopViz system is able to use an existing Intelligent E-Commerce (IEC) data warehouse 510 and decision support server 520 as shown in FIG. 5. Using existing data warehouse 510 and decision support server 520, allows the ShopViz system to leverage existing data models and report specifications.

Graphical Analyses

ShopViz includes the ability to generate graphical presentations or visualizations of the user's site, i.e., the e-store. There are several visualizations available to users and each is described more fully below.

An "Overview" visualization (FIG. 6) is a display of customer-selected business performance attributes of the pages in a site that have been visited by shoppers (or site segment). A "Referral" visualization (FIG. 7) is a display of the amount of traffic being sent to the site by top referrers, and the entry pages to which shoppers are sent. A "Page to Page Path Analysis" visualization (FIG. 8) is a display of the most frequently used paths between any two pages on a site of interest to the user. A "Path Analysis" visualization (FIG. 9) is a display of the most frequent links from one page to another page of interest to the user. Animation is enabled for at least the Overview visualization so users can step through static views of monthly or weekly performance data.

Users selectively filter the data retrieved from database 200 and displayed in order to refine analyses. Graphical attributes, such as size, and color, along with text, are used to represent the status of selected page and link parameters.

Users have direct access to reports. These reports are displayed in a separate window from the visualization. The data populating such a report or table is automatically filtered in the same way as the visualization from which it was requested, unless specified otherwise by the user.

Generic Capabilities

Data about each web page (represented by the nodes in the visualizations) is displayable by pointing to that node. Users are able to open multiple instances of a given type of visualization to facilitate comparisons among variations of shopper characteristics, referrers, or time periods. Users are able to do this from a menu bar that is available in each visualization. Users are able to save individual visualizations in a number of graphic formats including:

Hypertext Markup Language (HTML);
Compuserve Graphic Interchange Format (GIF);
JPEG Joint Photographic Experts Group (JPG);
TIFF Tag Image File Format (TIF); and
Windows Metafile (WMF).

Each visualization includes filtering and data exclusion capabilities native to the visualization engine. Users can reverse the effects (undo) of individual actions taken while interacting with a visualization. The main window includes a status bar providing users information about the progress of requests. Messages, such as "Opening Database" and Generating Visualization" are displayed in the status bar. Users can alter the filtering and metrics of a visualization while it is displayed. Accelerator keys that are standard to Windows (e.g., Ctrl+C for copy) and to the visualization engine (e.g., Ctrl+G for graph) are implemented on menubar pulldowns in each visualization. Windows frames may be movable by the end-user depending on the user's requirements of the visualization.

User Preferences Set Up

There is a certain amount of setup to tailor standard visualizations to accurately represent a user's web site or a specific c-store. The logical associations among pages are set up using the user's site hierarchy. Users choose which business performance attributes (e.g., sales dollars, abandonment rate) are displayed in each visualization, and determine which visual attribute (e.g., column height, color) is used to present each type of data. Text can be used to compliment a given visual code when it is important to see exact values for a node. ShopViz has a set of default settings. The base business performance attributes and defaults and recommended alternative visual attribute assignments are shown in Table 4 below:

TABLE 4

| | Visual Attributes | | | |
|---|---|---|---|---|
| Business Data | Color (shows range) | Node Height or Depth ($3^{rd}$ dimension) | Height/Width of Node Top Surface | Node Label |
| Sales $ | | a | a | A |
| Margin $ | | a | a | A |
| Conversion Rate | | a | a | A |
| Abandonment Rate | | a | a | A |
| Sales versus Prior Period | X | | | |
| Revenue versus Prior Period | X | | | |
| Number of Shoppers Converted for that Item | | X | a | A |
| Number of Shoppers Abandoning the Item on that Page | | X | a | A |

TABLE 4-continued

| | Visual Attributes | | | |
|---|---|---|---|---|
| Business Data | Color (shows range) | Node Height or Depth ($3^{rd}$ dimension) | Height/Width of Node Top Surface | Node Label |
| Number of Shoppers Abandoning at that Page | | X | a | A |
| Number of Items Sold | | a | X | A |
| Number of Shoppers Visiting | | a | X | A |
| Average Dwell Time | | X | a | A |
| Page Type (i.e., purpose of page) | | | | A |
| Page Title | | | | X |

X - Default association
a - Alternative association

Users must determine how the site navigation attributes (e.g., number of shoppers moving among pages) are assigned to the available visual attributes of lines (e.g., line thickness or color). Text can be used to compliment a given visual code when it is important to see exact values for a link. ShopViz comes with a set of default settings. These defaults and recommended alternative assignments are shown in Table 5 below:

TABLE 5

| | Visual Attributes | | | |
|---|---|---|---|---|
| Navigation Data | Color (shows range) | Line Thickness | Arrowhead | Text |
| Number of Shoppers | a | a | | X |
| Percentage of all Traffic (to or from a given node) | a | a | | X |
| Performance versus Plan (for any traffic measure) | X | | | |
| Associate link with a specific node | X | | | |
| Primary Direction of Traffic | | | X | |

X - Recommended default association
a - Alternative association

Threshold values must be set by a user to determine:
if a given link or path occurs frequently enough to be included in a visualization (e.g., to determine if a link is "popular" enough to be displayed);
Which performance band a node falls in (e.g., to determine which "performance versus plan" color is applied to each node).

Users can hone the data that is displayed to concentrate their analyses on certain populations of shoppers, shopper behaviors or entry points in the web site. These filters and their settings are:
Date Range—Any dates on record. The From date must be earlier than the To date.
Analyze Data—By Day, By Week, By Month, By Quarter
Sales/Session (decile)
From and To values: 1st, 2nd, 3rd, 4th, 5th, 6th, 7th, 8th, 9th, 10th
Sales/Session (dollar amount)
From values: $0, $25, $50, $100, $150, $200, $500, $1000, $5000, >$5000
To values: $25, $50, $100, $150, $200, $500, $1000, $5000, >$5000
Margin/Session (decile)—
From and To values: 1st, 2nd, 3rd, 4th, 5th, 6th, 7th, 8th, 9th, 10th
Margin/Session (dollar amount)
From values: $0, $25, $50, $100, $150, $200, $500, $1000, $5000, >$5000
To values: $25, $50, $100, $150, $200, $500, $1000, $5000, >$5000
# of Items Purchased/Session—
From Values: 0, 1, 3, 5, 10, 15, 20, 25, 50, >50
To Values: 1, 3, 5, 10, 15, 20, 25, 50, >50, Any
# of Sessions Before First Purchase—
From and To values: 1st, 2nd, 3rd, 4th, 5th, 6th, 7th, 8th, 9th, 10th
# of Sessions Between Purchases—
From and To values: 1st, 2nd, 3rd, 4th, 5th, 6th, 7th, 8th, 9th, $10^{th}$
Type of Shopper—All Shoppers, Browsers Only, Abandoners Only, New Customers Only, Customers Only, Repeat Customers
Type of Referrer—Search Engines, Catalogues, E-mail, Banner Ads, Other Sites, Direct,
Unknown
For values: and Min. # of Shoppers
Include—Include values: All Occurrences, Top 20 Only, Bottom 20 Only
For values: [blank], Sales $, Revenue $, Margin $, Conversion Rate, Abandonment Rate,
# of Items in Basket
Min. Number of Shoppers—Any Amount, 1, 10, 25, 50, 100, 250, 500, 1000, 2000, 500,
10000

The exact filter values are determined by the user. Availability of each filter depends on applicability of the filter to the visualization (e.g., Overview, Referral, Paths between two points, Single page). A button beside the Date Range fields enables users to automatically select periods when promotions and ad campaigns have taken place.

Items in the To dropdown menus are editable so only values greater than or equal to the To dropdown menus are visible. After selection, if the To setting is not equal to or greater than the From setting, an error message box is displayed directing the user to the problem and how to correct it.

Filters containing null, zero or blank data in the user's data set appear grayed out, and are unavailable for selection. Users can filter Sales/Session and Margin/Session by either decile or dollar amount, but not both simultaneously. When a non-default setting is selected for one (decile or dollar amount), then the other is grayed out.

To ensure that users know the context of a visualization, each diagram or visualization includes a display of the non-default filter settings with which the graph was created. Users can also determine the length of query timeout, e.g., in minutes and seconds.

Application Commands

Figure 10:
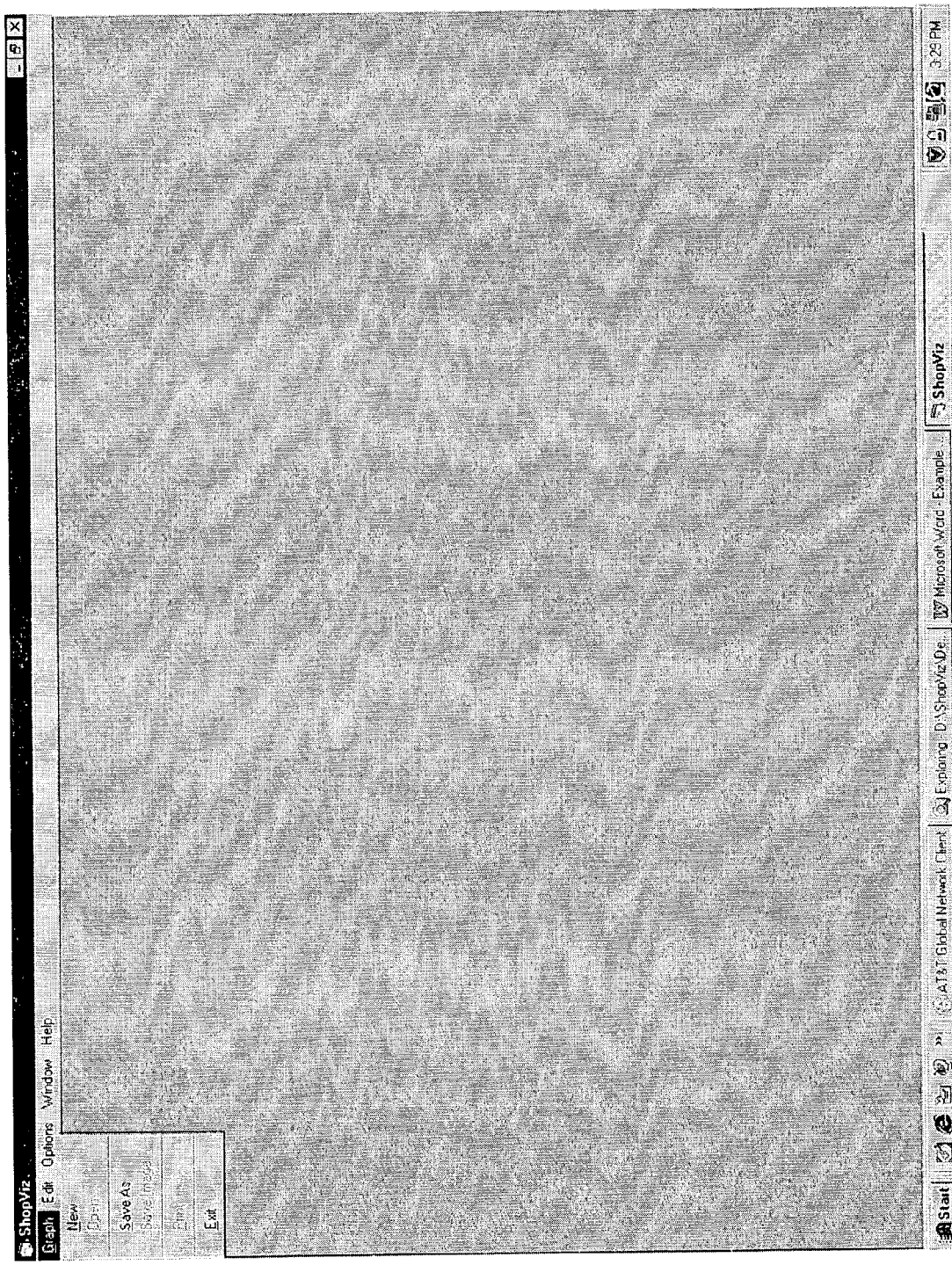
FIG. 10 is an example screenshot of an embodiment of the present invention.

The following commands are available, where appropriate, throughout the entire Shop Viz system as depicted in the screenshot of FIG. 10. The commands, grouped by the appropriate menubar title, include:

GRAPH (File)—New, Open, Save As, Save Image, Print, Exit;
EDIT—Undo, Redo, Copy Image, Paste Data, Filters, Metrics, Unselect, Select All, Exclude Selected, Exclude Unselected, Color Preference, Reapply Color;
OPTIONS—Reports, Auto Resize, Administrator, Security; and
HELP A screenshot of an example New Graph window displayed to a user after issuing the Graph menu's New command is depicted in FIG. 11. Commands whose operation is not determined either by the operating system or by the visualization engine include:

Filters—Displays the Change Filters dialog box used to alter a displayed visualization by changing the filters determining what data is included. The user can change any combination of filters within the edit rules set by the application. Using the Apply button, the user can temporarily apply the new filter settings to the visualization to see the effect of the changes. The user can also apply the changes permanently by clicking the OK button. Clicking the Reset button returns the filters to their settings when the Change Filters dialog box was first opened.

Metrics—Displays the Change Metrics dialog box used to alter a displayed visualization by changing the measurements graphed concerning data that matching the data filter settings. The user can also visualize new metrics by clicking the OK button. Clicking the Reset button returns the metrics to their settings when the Change Metrics dialog box was first opened.

Reports—Displays the Open Related Reports dialog box presenting all of the OLAP reports logically related to the displayed visualization. The user can select and display any of the reports and each selected report is presented in a separate window.

The non-standard accelerator keys are listed in Table 6 below.

TABLE 6

| Filters | Cntl + L |
|---|---|
| Metrics | Cntrl + M |
| Reports | Cntl + R |

The user Procedure for Selecting a Visualization includes the following steps:
1. Choose Overview, Referral, Path, or Page analysis
2. Choose the desired Overview map, page(s) to be viewed
3. Filter data
4. Initiate visualization Direct Access to Tabular Reports Reports can be accessed from ShopViz screens via a menu bar. Data in these reports is filtered in the same way as the visualization from which the report is selected. Default reports are associated with each visualization. The user has access to the complete set of reports.

Publishing

Users can save all or portions of a visualization in one of the following forms:
Individual graphs (within a given splitter window) can be saved in GIF, or JPEG formats, and;
Entire visualizations can be saved in HTML format, or the format specific to the visualization tool.

Printed graphs include a label for every distinguishable node over 7 points in size.

EXAMPLE

Figure 6:
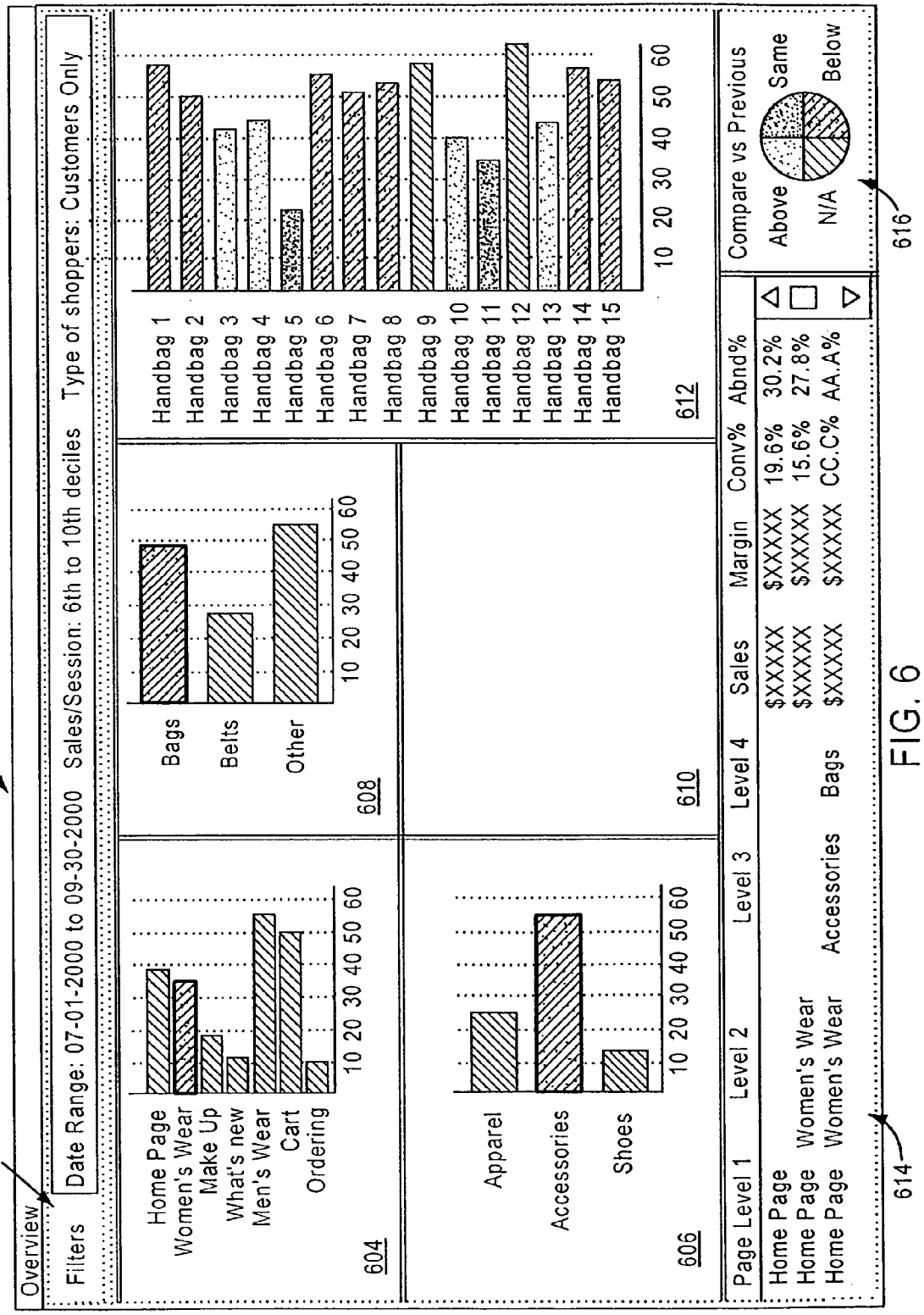
FIG. 6 is an example overview visualization interface displayed by an embodiment of the present invention.

Several visualization examples are described below.
Visualization 1—Overview of the Entire Site The Overview visualization 600, as shown in FIG. 6, enables the user to see the "big picture" of consumer activity on a site or e-store. Overview analyses display only the pages of a site and the selected parameters. The multitude of paths that can be traveled in the site are not shown on the diagram. Users use other visualizations to study link activity among pages.

As a default, Overview visualizations do not display individual product pages. This data is aggregated up to the lowest Category page in the logical hierarchy. Customers with extensive sites can set up multiple Overview visualizations, each of which displays only a subset of the entire site. One or more of these subsets may include individual product pages. When customers create Overview visualizations displaying individual product pages, Shop Viz displays only those pages visited by customers during the selected date range.

Any of the following data types can be displayed in an Overview visualization:
Sales Dollars;
Margin Dollars;
Conversion Rate;
Abandonment Rate;
Sales versus Prior Period;
Revenue versus Prior Period;
Number of Shoppers Converted for an Item;
Number of Shoppers Abandoning the Item on a Page;
Number of Shoppers Abandoning at a Page;
Number of Items Sold;
Number of Shoppers Visiting; and
Average Dwell Time.

The exact metrics graphed in a visualization are determined by the user.

The currently specified filters used to generate the overview 600 are displayed in filter display field 602. For example, filter display field 602 identifies that the data displayed was captured between Jul. 1, 2000 and Sep. 30, 2000, includes the 6th through 10th deciles of sales, and only includes customer type shoppers.

Graph display region 604 displays a bar graph of the number of customers visiting top-level web pages at the e-store. The women's wear entry is currently selected in graph display region 604. Responsive to the selection in graph display region 604, a graph display region 606 is updated to display further detail information.

Graph display region 606 displays a detail graph of customer visitation numbers for second level web pages in the women's wear portion of the e-store. The accessories entry is currently selected in graph display region 606. Responsive to the selection in graph display region 606, a graph display region 608 is updated to display further detail information.

Graph display region 608 displays a detail graph of customer visitation numbers for third level web pages in the accessories portion of the women's wear portion of the e-store. The bags entry is currently selected in graph display region 608. Graph display region 610 is able to display a further detail graph of a portion of the e-store, but is currently blank indicating there are no lower level categories of web pages below the currently selected web page in graph display region 608. Responsive to the selection in graph display region 608, a graph display region 612 is updated to display further detail information about the customer visitations to web pages in the bags portion of the e-store.

Graph display region 612 displays a detail graph of customer visitation numbers for web pages in the bags portion of the e-store. A tabular display region 614 displays detailed financial and sales information about customer visitation to web pages of the e-store. The detailed information displayed in tabular display region 614 includes the dollar value of sales and margin on sales, conversion rate, and abandonment rate of customers at the particular web page.

A graphical legend region 616 displays a legend identifying the shading and/or color definitions for the graphs displayed in graph display regions 604, 606, 608, 610, and 612. For example, bar on web page bar graphs in the graph display regions using the same shading as the upper left quadrant of the legend indicate that these web pages have above average traffic as compared to a previous time period. The upper right quadrant shading or color specifies that the traffic level or customer visitation numbers are the same and the lower right quadrant shading specifies that the traffic level is below the previous period. There are many different legends possible and the present embodiment should not be viewed as limiting.

Two visual dimensions are available: the height, and the color of each bar in the bar graphs. Users can create multiple Overview templates, visualizing different pairs of business data in each template.

Users can zoom in or out of an Overview section of to get a clearer view of the activity in a particular portion of the site. Users can page and scroll visualizations when the visualizations are larger than the visible area of the window in which they are presented.

Visualization 2—Referral Analysis

Figure 7:
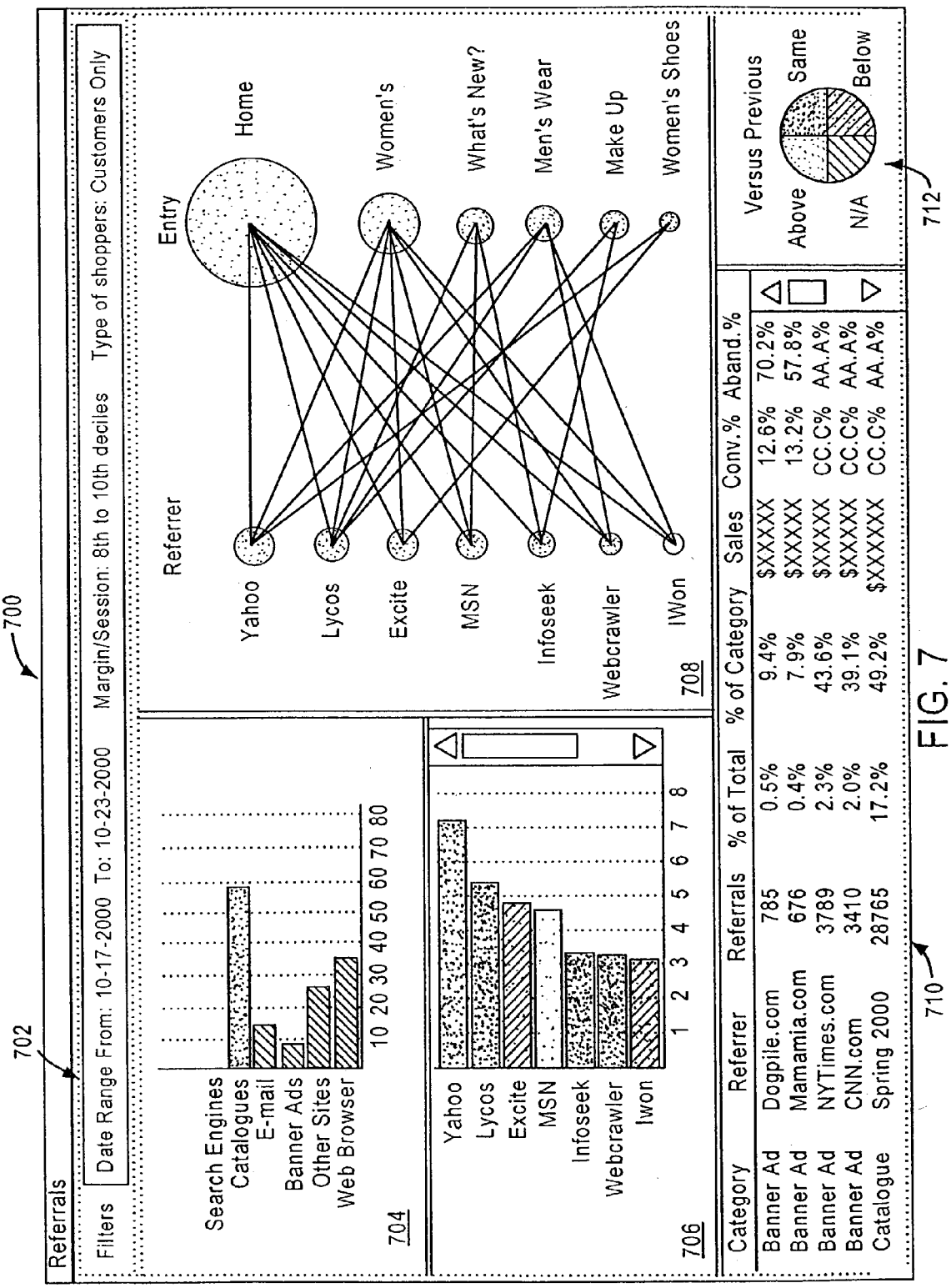
FIG. 7 is an example referral visualization displayed by an embodiment of the present invention.
Figure 8:
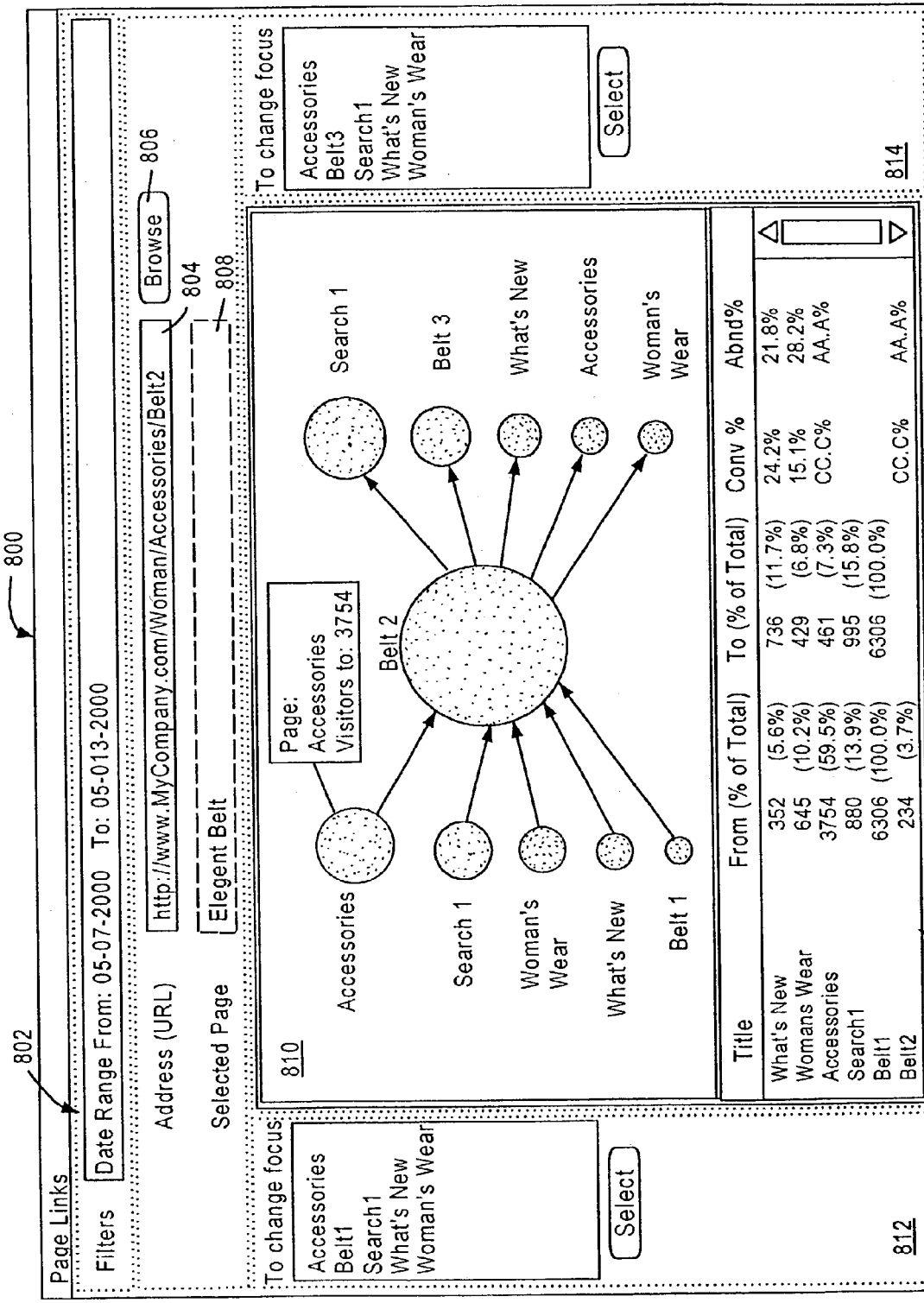
FIG. 8 is an example page link visualization displayed by an embodiment of the present invention.

The Referral visualization 700, as shown in FIG. 7, is used to display the traffic that is referred to a site from one or more sources. Sources may include web sites, banner ads, search engines, or email links. A Referral visualization 700 enables users to analyze the sources of web traffic, business performance of referred shoppers, and the primary pages used to enter the site. Sources of traffic and entry pages can be ranked visually by magnitude.

The currently specified filters used to generate the referral visualization 700 are displayed in filter display field 702. For example, filter display field 702 identifies that the data displayed on referral 700 was captured between Oct. 17, 2000 and Oct. 23, 2000, includes the 8th through 10th deciles of sales, and only includes customer type shoppers.

Graph display region 704 displays a bar graph of the number of customers referred to web pages at the e-store and from where the customers were referred. For example, approximately 23 customers were referred to the e-store by search engine web sites. The search engines entry is currently selected in graph display region 704. Responsive to the selection in graph display region 704, a graph display region 706 is updated to display further detail information.

Graph display region 706 displays a detail graph of customer referral numbers for individual search engines referring customers to the e-store. Further responsive to the selection in graph display region 704, a graph display region 708 is updated to display a directed graph of the search engines referring customers to the c-store. The size and shading or color of the icons in graph display region 708 indicates the number of customers referred and the number referred in comparison to a previous time period as indicated by a legend 712.

A tabular display region 710 displays detailed financial and sales information about customer visitation to web pages of the e-store. The detailed information displayed in tabular display region 710 includes the referrer name, number of referrals, percentage of total referrals, percentage of the particular category selected, dollar value of sales from the referrer, and conversion and abandonment percentages for customers from specific referrers.

A graphical legend region 712 displays a legend identifying the shading and/or color definitions for the graphs displayed in graph display regions 704, 706, and 708. Graphical legend region 712 is similar to graphical legend region 616 described in detail above.

Users can choose the business metric that is visualized:
Number of shoppers referred from each source;
Conversion rate of shoppers from each referrer;
Abandonment rate of shoppers from each referrer;
Totals sales of shoppers from each referrer;
Profitability of shoppers from each referrer; and
Margin of shoppers from each referrer.

A portion of the Referral visualization 700 displays selected business performance data of the shoppers who are referred from each identifiable source, including:
Sales from referred shoppers;
Conversion Rate of referred shoppers;
Abandonment Rate of referred shoppers; and
Average number of basket items for referred shoppers.

The exact metrics graphed in the Referral visualization 700 are determined by the user and may vary. The above metrics and data are exemplary in nature and are not intended to limit the scope of the invention.

Visualization 3—Page Links (Into and Out of a Single Page)

Users can analyze the details of shoppers' movements into and out of a specific page with Page Links visualization 800. Similar to filter display field 602 of overview visualization 600, the currently specified filters used to generate the page links visualization 800 are displayed in filter display field 802. For example, filter display field 802 identifies that the data displayed on page links 800 was captured between May 7, 2000 and May 13, 2000. Users select a page on the e-store for visualization, using either a URL field 804 or browser button 806, to display the frequently used paths into and out of the selected page. The selected page title is displayed in text box 808. The threshold frequency of use necessary for a path to be displayed is set in a Threshold/Preferences dialog box (not shown). The selected web page and the pages feeding traffic to and receiving traffic from the page are represented as circles (nodes) in a graph display region 810. Graph display region 810 is a graphical diagram of the path to and from the selected web page displayed in text box 808. The size of each node represents the relative magnitude of the traffic sent or received.

Placing the pointer or mouse over an input or output node displays the following information about the node or web page, such as:
Name of the web page;
Number of shoppers (meeting the criteria set in the filters) passing through the page; and
Percentage of the total traffic passing through the selected page (meeting the criteria set in the filters) coming from or going to the page under the pointer.

The information displayed can vary and is determined by the user. Selecting an input or output node highlights the traffic passing through the selected node or page among all other nodes in the graph. The total traffic going through the other pages is still displayed, but in a subdued color.

Exits from the site can also be represented in the Page Links visualization 800; however, all exits are aggregated into one node on the graph.

The hard copy print out of a Page Links visualization 800 can include labels of all the pages represented in the graph.

A focus selection region 812 lists the input nodes or web pages from graph display region 810. If a user desires to change the focus of display region 810, e.g., to view the input and output statistics of a different node, the user may select an entry from the list presented in focus selection region 812. The selection may either be a double-click activation of an entry or selection of the entry and activation of the select button. In response to selection of an entry, i.e., a focus change, graph display region 810 is updated to display the new focus node and the corresponding input and output.

Similar to focus selection region 812, focus selection region 814 includes a list of the output nodes from graph display region 810. The user may change focus of graph display region 810 by selecting and activating an entry in the list of focus selection region 814.

A tabular display region 816 displays detailed statistical information about customer visitation to and from the focus web page (indicated in graph display region 810) of the e-store. The detailed information displayed in tabular display region 816 includes the percentage of customers coming from and going to the specific page, conversion rate, and abandonment rate of customers coming from and going to the particular web page.

Visualization 4—Paths Between Two Specified Pages

Figure 9:
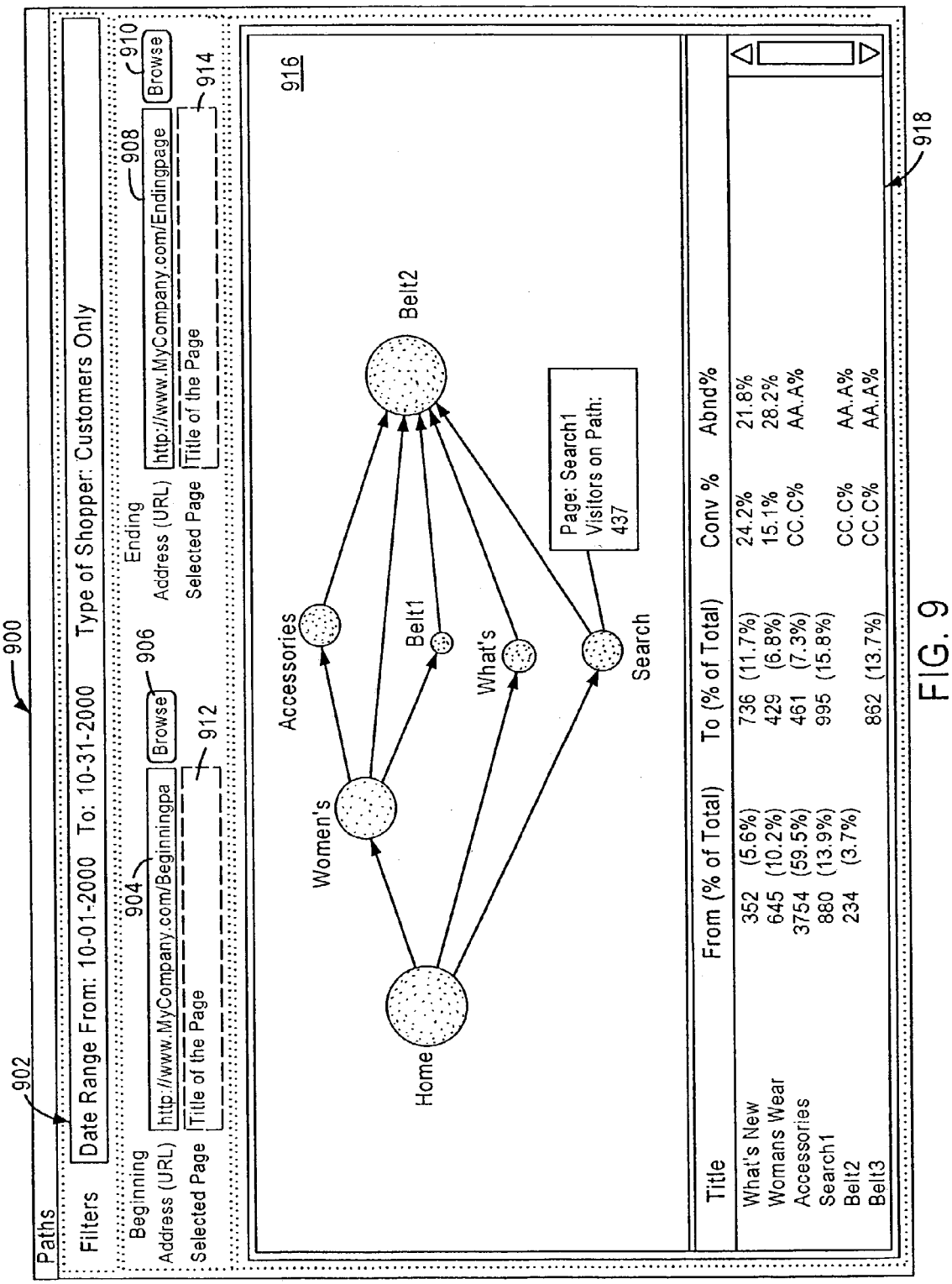
FIG. 9 is an example path analysis visualization displayed by an embodiment of the present invention.

Users can do more detailed analysis of shoppers' movements between two specific pages using the Path analysis visualization 900, as shown in FIG. 9. Similar to filter display field 602 of overview visualization 600, the currently specified filters used to generate the path analysis visualization 900 are displayed in filter display field 902. For example, filter display field 902 identifies that the data displayed on path analysis 900 was captured between Oct. 1, 2000 and Oct. 31, 2000 and includes only customer-type shoppers. Using either a URL field, beginning URL field 904 or ending URL field 908, or pop-up browser, beginning browser 906 or ending browser 910, the user selects any two pages on a site to display the frequently used paths between the two pages. The frequency of use necessary for a path to be displayed is set in a Threshold/Preferences dialog box (not shown). The titles of the selected beginning and ending pages are displayed in text box 912 and 914, respectively.

Graph display region 916 is a graphical diagram of the frequently used paths between the selected beginning and ending web pages 912 and 914. Intermediate nodes traversed are displayed in the graph display region 916.

Each page in a popular path is represented by a circle (node). The amount of traffic going through each page is represented by the size of that node. For example, the larger the node, the more traffic. ShopViz displays the most efficient map possible of the frequently used paths between the two chosen pages 912 and 916. Each node appearing in one or more paths appears only once in a given diagram. For example, there are three paths traversing women's wear, but only a single corresponding node in region 916.

Placing the pointer over a node displays information about that web page, such as:
Name of the web page;
Number of shoppers (meeting the criteria set in the filters) passing through the page; and
Percentage of the total traffic between the start and end pages (meeting the criteria set in the filters) passing through the page.

The information displayed can vary and is determined by the user. Selecting one of the intermediate nodes alters the visualization to highlight the traffic that passed through that node and show how those shoppers moved among other downstream nodes to the end page. The total traffic between the start and end pages is still displayed, but in a subdued color. Shading and transparency may also be used in addition to color.

An item representing all exits from the site is available for selection as an Ending page. This selection aggregates all exits from the site as though they were all one page, and results in a graph showing the most popular paths leading to exits from the site.

The hard copy print out of a Path visualization 900 can include labels of all of the pages represented in the graph. A tabular display region 918 displays detailed statistical information about customer visitation from the selected beginning to the ending web page 912 to 914 (indicated in graph display region 916) of the e-store. The detailed information displayed in tabular display region 918 includes the percentage of customers coming from and going to the specific page, conversion rate, and abandonment rate of customers traversing from the beginning to the ending web page. The data displayed in region 918 can vary and is determined by the user. The aforementioned information is not meant to be limiting and is intended to be exemplary.

Visualization 5—Animation

Animation is additional functionality added to the other visualizations. In combination with an Overview 600 or Referral 700 diagram, a user can see how the business performance of a web site changes over time, from month to month or even week to week. This is especially useful when significant changes are made to a web site, enabling "Before and After" comparisons.

Figure 12A:
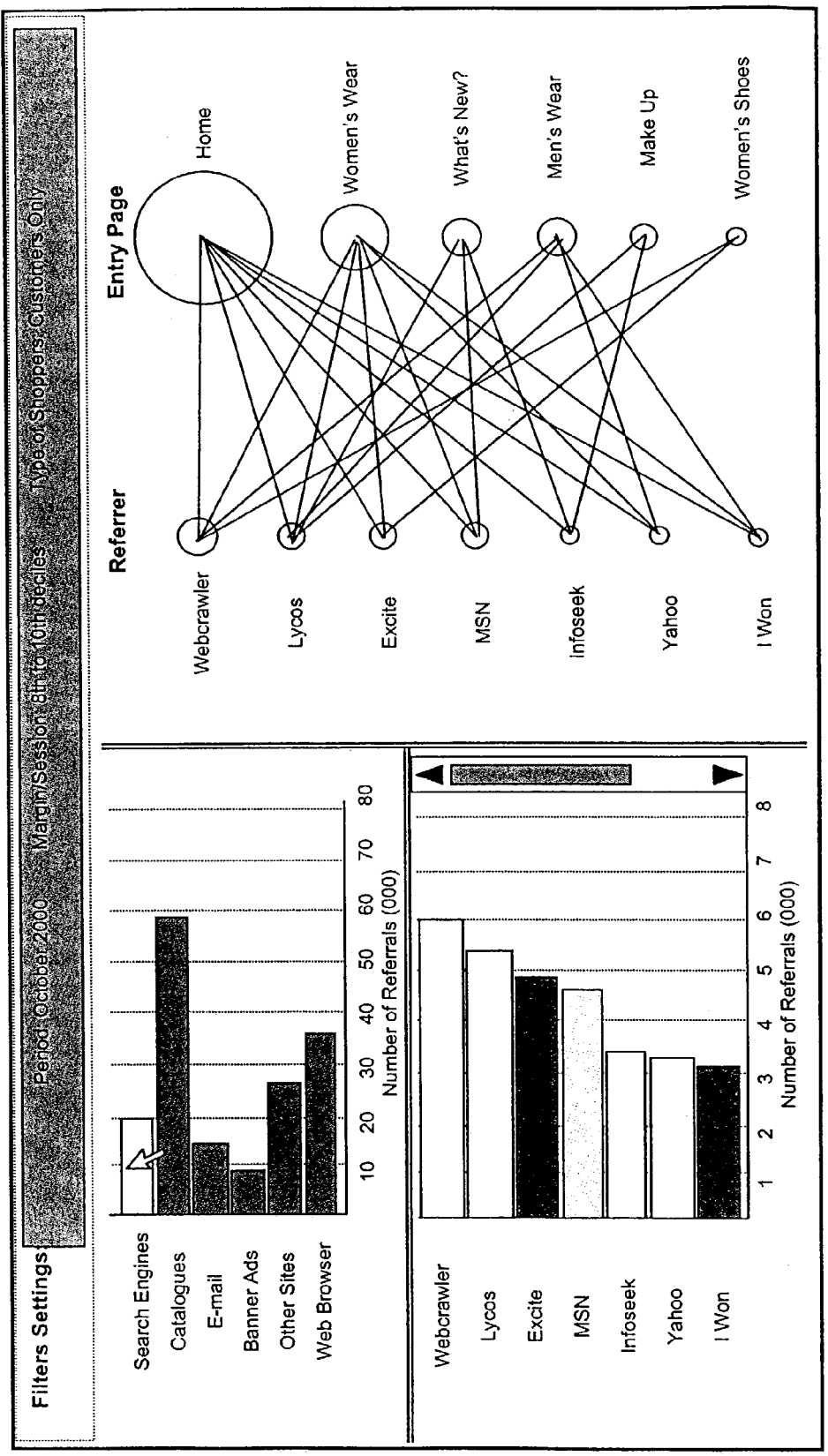
FIGS. 12a-c are selected screenshots of steps in an animation according to an embodiment of the present invention to display the number of search engine referrals to a particular web site.
Figure 12B:
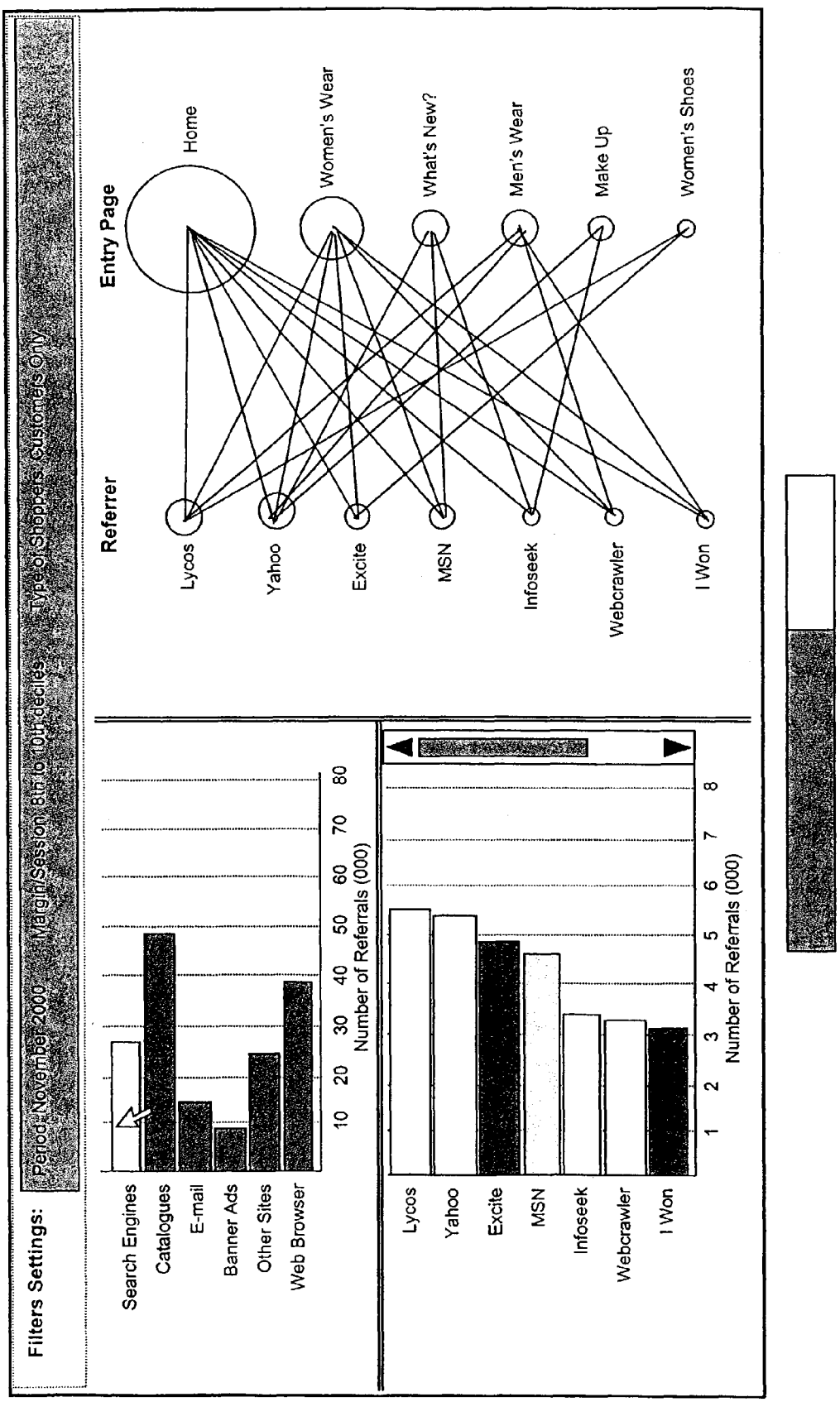
Figure 12C:
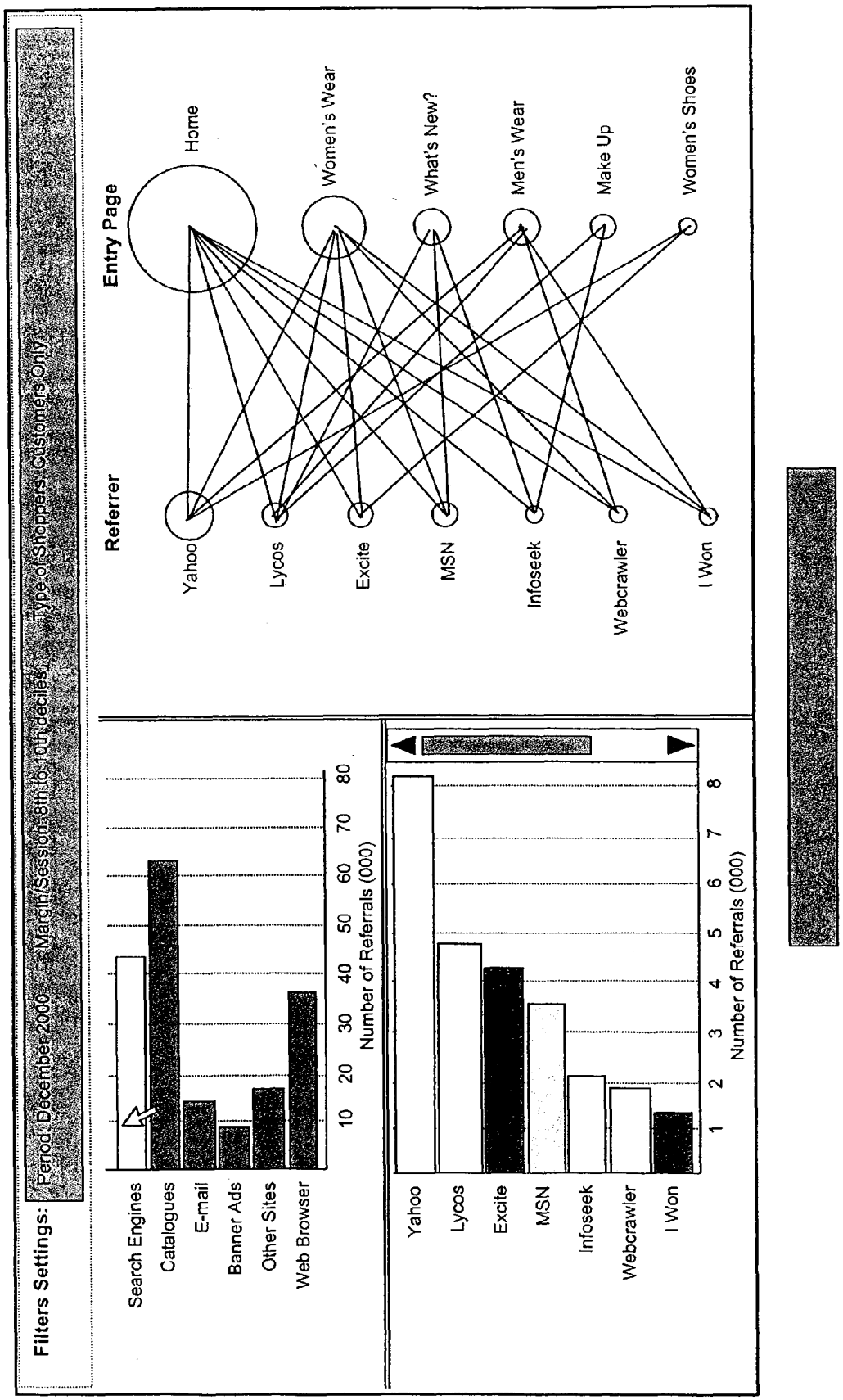

An example sequence of an animation is depicted in FIGS. 12*a*-12*c* wherein the referring sites are graphed on a monthly basis from October through December. Note that, as depicted in the figures, Search Engine references from the Yahoo site increased each month.

The controls and displays required to implement animation include:
Start and Stop buttons to initiate and suspend the automatic animation;
Variable Speed Control to set the pace of the animation;
Previous (action) and Next (action) buttons to jump to the next incremental time slice of data (e.g., from March to April to May). These controls are usable only when the animation is stopped;
Beginning and End buttons to jump to the beginning or end of the time period requested by the user;
An indication of the time period (date(s) and year) being presented; and
An indication of the size of each time increment (i.e., step).

When requesting an animation, the user must first enter the beginning and ending dates, and select the amount of time for each step (e.g., a step increments the visualization by an hour, a day, a week, a month).

ShopViz focuses on the following business problem areas:
Lack of Conversion of a Shopper
Determine the traffic patterns of shoppers or customers not purchasing items' in order to determine the potential reasons they did not purchase.
Analyze the last pages viewed by browsers and market basket abandoners.
Understand the collection of pages found frequently in shoppers who do not purchase as compared to shoppers who purchase.

Trends in Successful Shopper Conversion
  Understand the collection of pages found frequently in shoppers that do purchase as compared to shoppers that do not purchase.
  Understand how new customers and repeat customers shop the site. Determine what collections of pages are different between these two groups.
Determine the High Traffic areas of the site by customer segment and customer attribute
  Determine the traffic patterns by customer segment to develop a merchandising and marketing strategy to best reach these customers. Leverage high traffic areas with advertisers or manufacturers to capture maximum revenue for the retailer in the high traffic areas of the site.
  Understand how different types of customers shop the site. This customer shopping information may be input into personalization strategies or site design strategies.
Achievement of Site Design Goals
  Provide an ability to measure the effectiveness of site design goals, such as encouraging a specific shopping model, or the ability to purchase items in fewer page views.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of analyzing and graphically displaying web traffic data, comprising the steps of:
  capturing traffic data generated by customers visiting a web site and storing said captured traffic data in a computerized database;
  receiving a user request, wherein the user request includes a visualization request;
  selecting traffic data from said database in response to receiving the user request;
  analyzing the selected traffic data; and
  displaying the analyzed selected traffic data to the user; and
  wherein said visualization request includes a data filter specification including at least one of date range, sales range, margin range, items purchased range, customer type, referrer type, and number of customers.

2. The method of claim 1 wherein the visualization request includes a graphic format specification.

3. The method of claim 1 wherein the visualization request includes a business data specification.

4. The method of claim 1 wherein the analyzed selected traffic data displayed is displayed in at least one of an overview, referral, path, page-to-page, and animation type display.

5. The method of claim 4 wherein the overview type display includes an overview graph and site-related business data.

6. The method of claim 5 wherein the site-related business data includes at least one of sales dollars, margin dollars, conversion rate, abandonment rate, sales versus prior period, revenue versus prior period, number of customers converted for an item, number of customers abandoning an item on a page, number of customers abandoning a page, number of items sold, number of customers visiting, and average dwell time.

7. The method of claim 4 wherein the referral type display includes a referral graph and referral-related business data.

8. The method of claim 7 wherein the referral-related business data includes at least one of number of customers referred from each referrer, conversion rate of customers from each referrer, abandonment rate of customers from each referrer, total sales of customers from each referrer, profitability of customers from each referrer, and margin of customers from each referrer.

9. The method of claim 7 wherein the referral-related business data includes, for each referral source, at least one of sales from referred customers, conversion rate of referred customers, abandonment rate of referred customers, and average number of basket items for referred customers.

10. The method of claim 4 wherein the path type display includes a path graph and path-related business data.

11. The method of claim 10 wherein the path-related business data includes at least one of a number of customers passing through a page, and a percentage of total traffic between a start and end page passing through a page.

12. The method of claim 4 wherein the page-to-page type display includes a page-to-page path graph and page-to-page related business data.

13. The method of claim 12 wherein the page-to-page related business data includes at least one of a number of customers passing through a page, and a percentage of total traffic between a start and end page passing through a page.

14. A method of analyzing and graphically displaying web traffic data, comprising the steps of:
  capturing web traffic data generated by customers visiting a web site and storing said captured web traffic data in a computerized database;
  receiving a user request, wherein the user request includes a visualization request;
  selecting web traffic data in response to receiving the user request;
  analyzing the selected web traffic data; and
  displaying the analyzed selected web traffic data to the user; and
  wherein said visualization request includes a data exclusion specification including a date threshold value, a sales threshold value, a margin threshold value, an items purchased threshold value, and a number of customers threshold value.

15. A computer-implemented system for analyzing and graphically displaying web traffic data, comprising:
  a computerized database for storing traffic data generated by customers visiting a web site;
  a visualization application for analyzing and displaying traffic data selected from said database; and
  a user interface a user submits a user request, said user request including a visualization request; and
  wherein said visualization application:
    selects traffic data from said database in response to said user request;
    analyzes the selected traffic data; and
    displays the analyzed selected traffic data to the user; and
  wherein said visualization request includes a data filter specification including at least one of date range, sales range, margin range, items purchased range, customer type, referrer type, and number of customers.

16. The system of claim 15 wherein the visualization application displays the analyzed selected traffic data in at least one of an overview graph, a referral graph, a path graph, a page-to-page path graph, and an animation graph.

17. The system of claim 15, said visualization application further comprising a relational-to-graph converter and a graph layout converter.

18. A computer-implemented system for analyzing and graphically displaying web traffic data, comprising:
- a computerized database for storing traffic data generated by customers visiting a web site;
- a visualization application for analyzing and displaying traffic data selected from said database; and
- a user interface a user submits a user request, said user request including a visualization request; and
- wherein said visualization application:
  - selects traffic data from said database in response to said user request;
  - analyzes the selected traffic data; and
  - displays the analyzed selected traffic data to the user; and
- wherein said visualization request includes a data exclusion specification including a date threshold value, a sales threshold value, a margin threshold value, an items purchased threshold value, and a number of customers threshold value.

* * * * *